Dec. 6, 1938.  C. L. STEVENS  2,139,178
WHEEL SUSPENSION
Filed Oct. 5, 1936   2 Sheets-Sheet 2

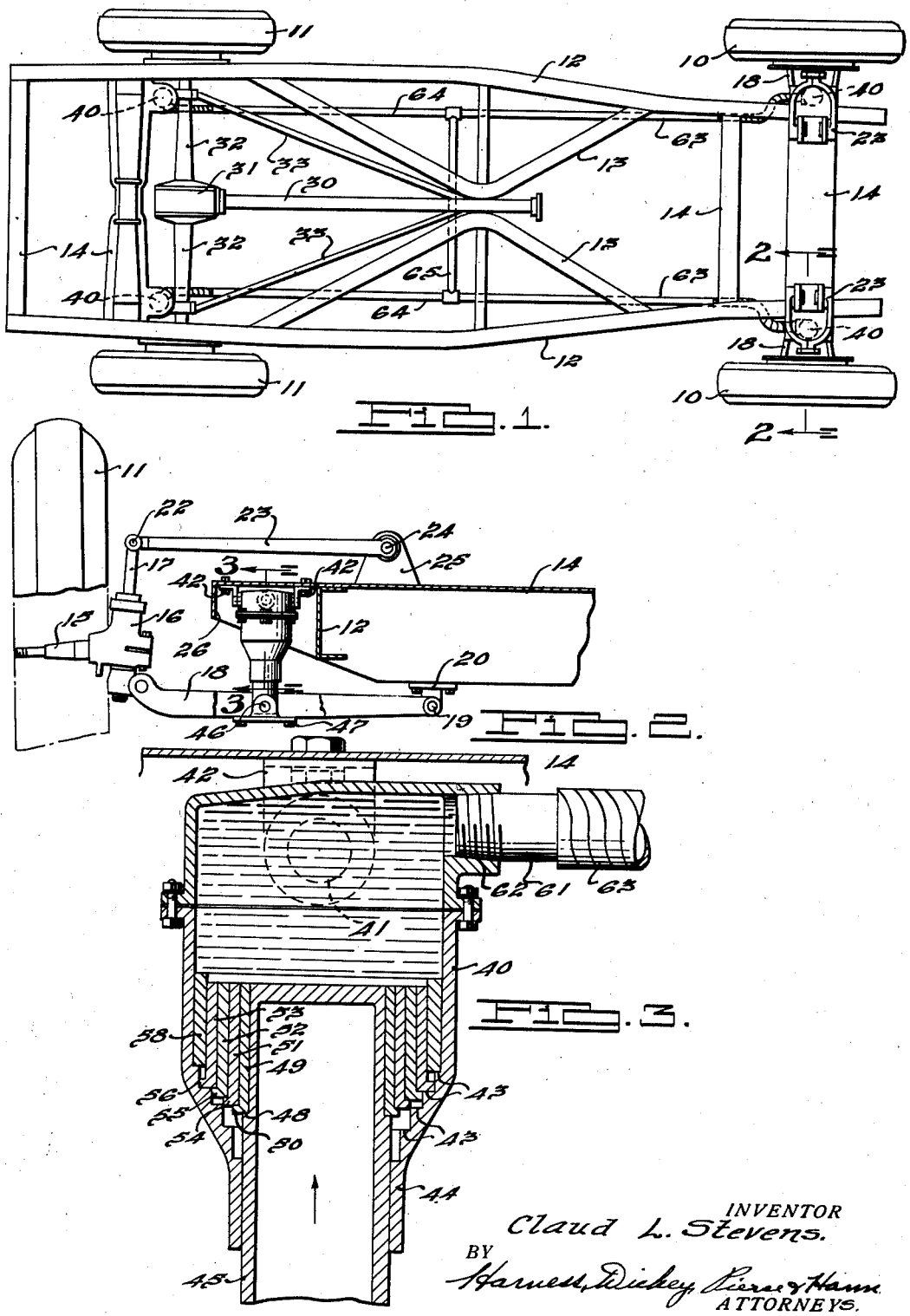

INVENTOR
Claud L. Stevens.
BY
Harness, Dickey, Pierce & Hann
ATTORNEYS.

Patented Dec. 6, 1938

2,139,178

UNITED STATES PATENT OFFICE 2,139,178

WHEEL SUSPENSION

Claud L. Stevens, Detroit, Mich.

Application October 5, 1936, Serial No. 104,014

3 Claims. (Cl. 280—124)

This invention relates to vehicle suspensions. More particularly it relates to a novel construction and arrangement primarily adapted for resiliently supporting the body of an automotive vehicle on the chassis thereof.

The practice of using springs in one form or another has long been considered standard for supporting the bodies of automotive vehicles on the chassis thereof. Such constructions as elliptic and semi-elliptic leaf springs have long been commonly used, as well as transverse springs of the leaf type. Further some efforts have been made to utilize helical coil springs disposed upon a substantially vertical axis, as well as various types of pneumatic suspension constructions which have been used experimentally.

The fundamental object of all of the above mentioned forms of spring suspensions has been to absorb as much as is reasonably possible of the shock encountered while travelling over rough surfaced highways. Many of the forms of spring suspensions mentioned above fail to attain this desired result due to the rebound of the springs and efforts have been made to overcome this difficulty by the utilization of various types of shock absorbers.

It is a primary object of the present invention to provide means for supporting the body of a vehicle upon the chassis thereof in such a manner that the riding characteristics of the body will be extremely satisfactory, and the inherent difficulties existing in the spring suspensions now known will, in the main, be overcome. To this end the present invention contemplates the provision of a plurality of hydraulic cylinders vertically disposed adjacent the mounting of each of the individual wheels of the vehicle, such hydraulic mechanisms being interconnected with one another in order that as shock is imposed on one of the individual wheels this shock will be substantially uniformly transmitted and distributed to the remaining wheels of the body and thus distributed throughout the entire chassis, consequently maintaining the level of the body substantially constant during the time the road shock is being absorbed.

The present invention contemplates in one form the utilization of a hydraulic system for actually receiving shock and means for transmitting this shock through a central air cushion to the remaining portions of the vehicle suspension in order that the force of the shock will be resiliently transmitted and absorbed uniformly through the entire suspension construction.

Many other and further objects, advantages and features of the present invention will become clearly apparent from the following specification when considered in connection with the accompanying drawings forming a part thereof.

In the drawings provided:

Figure 1 is a plan view of a vehicle chassis illustrating a body frame mounted thereon and embodying one form of the improved suspension of the present invention;

Fig. 2 is an enlarged fragmentary sectional view taken substantially on the line 2—2 of Fig. 1 illustrating one form of hydraulic suspension which has been found particularly satisfactory;

Fig. 3 is an enlarged fragmentary sectional view taken substantially on the line 3—3 of Fig. 2 illustrating in detail the interior construction and arrangement of parts of one of the hydraulic suspension units;

Figure 4:
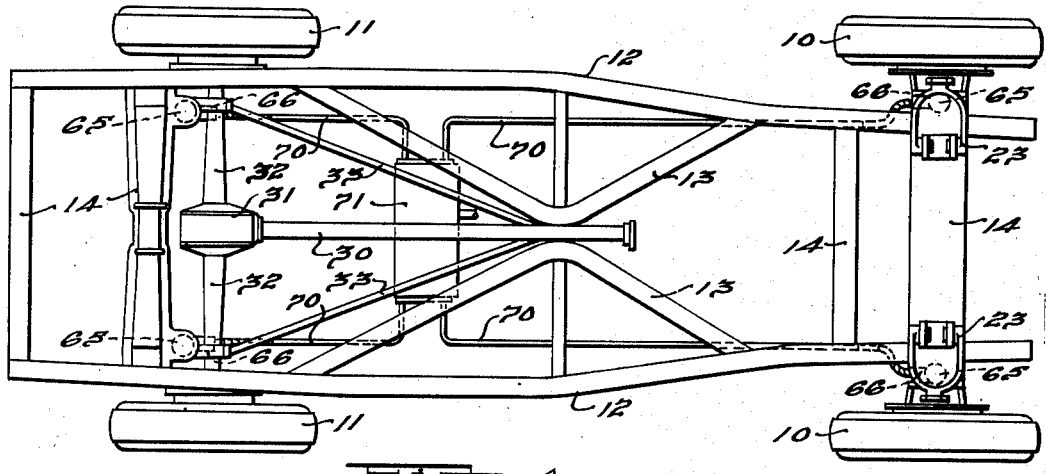
Fig. 4 is a plan view of a vehicle chassis similar to Fig. 1 illustrating a modified form of the present invention.
Figure 5:
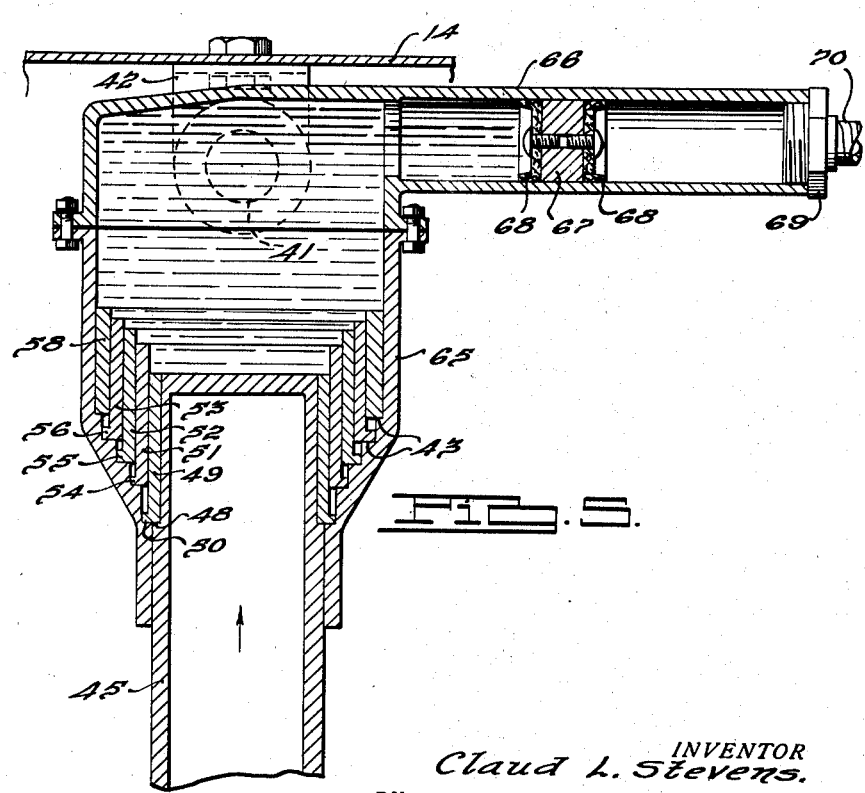
Fig. 5 is an enlarged fragmentary sectional view taken through one of the hydraulic suspension units utilized in the modified form of the invention shown in Fig. 4.

With more particular reference to the drawings it will be readily understood that the embodiments of the invention illustrated in the accompanying drawings and described below are merely illustrative of specific types of construction which have been found particularly satisfactory, and it will be readily understood that substantial modifications and departures therefrom may readily be made without departing from the generic spirit of the invention as defined in the subjoined claims.

In Fig. 1 is shown a vehicle chassis construction including front wheels 10 and rear wheels 11. The chassis of the vehicle, as is conventional in constructions of this general character, includes a pair of channel members forming side frames 12 which are rigidly interconnected with each other by means of suitable X braces such as are conventional in constructions of this general character. The chassis frame as a whole may also be interconnected by suitable transversely extending cross-frame members 14 at various points in order to provide the necessary rigidity. It is upon this frame that the body of the vehicle is rigidly mounted, and in constructions of this general character it will be readily understood that no relative movement of the body with respect to the frame is permitted.

While the front wheels of the vehicle may be mounted in any convenient manner in the specific embodiment shown they are journalled upon stub axles 15 which project through and are integrally formed with housings 16 which surround vertically disposed king pins 17. Each king pin is pivotally connected at its lower end to a lower wishbone 18 such as is usually used in independent wheel suspensions, and it is seen that the inner end of these wishbones 18 are pivotally connected at 19 to brackets 20 permanently anchored to the frame.

The upper end of each king pin 17 is pivotally connected at 22 to an upper wishbone 23, which is likewise pivoted at 24 upon a suitable bracket 25 firmly mounted upon the chassis frame. The transversely extending brace member 14 which interconnects the longitudinally extending frame members 12 at this point preferably is extended to the outboard side of the frame member 12 and provides a housing generally designated as 26, which serves to provide means for supporting the upper end of the improved suspension unit hereinafter described in detail.

Both of the front wheels may be conveniently supported in the manner illustrated in Fig. 2 and the present invention contemplates the utilization of a rear wheel suspension of somewhat similar construction. In the particular form of the invention shown the vehicle is provided with a torque tube 30, which is rigidly connected to the differential housing 31 and has axle housings 32 extending laterally therefrom which housings serve to support the wheels in order to maintain these axle housings in predetermined relative position with respect to the torque tube 30 and differential 31. Radius rods 33 are provided which serve to interconnect the outer ends of the axle housings with the forward end of the torque tube providing a substantially rigid framework. The axle housings at this point may be conveniently provided with lugs for adjustment of the improved hydraulic suspensions, the upper ends of which are pivotally connected to the under side of one of the transverse braces of the framework of the chassis. Any suitable type of rear end construction may be utilized and the specific form of torque tube drive rear end assembly is illustrated merely because in this form of construction driving thrust from the rear wheels is absorbed by the torque tube and radius rods and consequently such thrust will not be transmitted to the vehicle body through the hydraulic suspensions.

The individual suspension units each comprise a generally cylindrical housing 40 which may be provided at its lateral sides adjoining the upper end thereof with projected trunnions 41, which are journalled in brackets 42 bolted directly to the chassis frame. The interior of the housing is substantially cylindrical in configuration and of substantially uniform diameter throughout the body portion thereof. The lower end of the housing has a reduced diameter and the generally tapered inner wall of this housing is recessed to provide a plurality of annular shoulders 43, the purpose and function of which will hereafter become clear. The extreme lower end of the housing is preformed to provide a cylindrical neck 44 which is adapted to receive a piston 45, the lower end of which is pivotally connected to the wheel supporting member with which the particular hydraulic suspension is associated. This connection is preferably established by means of a pivot pin 46 journalled in a bracket 47.

This piston 45 is of a diameter adapted to closely fit the interior of the neck portion 44 of the housing 40. The piston has a slightly reduced diameter at its upper end to provide an annular shoulder 48 and around this upper end of the piston is mounted a sleeve 49 which snugly but slidably fits the reduced portion of the end of the piston and which sleeve has a radially extending flange 50 at its lower axial end. Similar sleeves 51, 52 and 53 arranged in concentric relation snugly and slidably fit one over the other surrounding the sleeve 49, and are each provided with flanges 54, 55 and 56, respectively, which extend radially outwardly from the lower axial end of the sleeves. Surrounding the sleeve 53 and fitting snugly between the exterior surface of this sleeve and the interior surface of the housing 40 is a sleeve 58. The entire interior of the housing 40 is filled with oil or other suitable hydraulic fluid and is connected by means of a nipple 61 threadably received in a suitable aperture 62 of the housing 40, and has its opposite end connected with a conduit 63 which extends from the front hydraulic suspension to the rear hydraulic suspension along the side of the vehicle. This conduit is interconnected with a similar longitudinally extending conduit 64 on the opposite side of the vehicle by means of a pipe 65 interconnecting these two conduits and thus establishing free communication between all of the individual hydraulic suspensions.

It will be readily appreciated that as the piston 45 moves up from its extreme lower position movement the shoulder 48 thereof will engage the lower axial end of the sleeve 49 and effect upward movement of this sleeve with the piston. Upon further upward movement of the piston the radial flange 50 on the sleeve 49 will engage the axial end of the next adjoining sleeve 51 to effect upward movement thereof along with the sleeve 49 and piston 45. This same function will be repeated until all of the sleeves 49, 51, 52, 53 and 58 will move in unison with the piston consequently increasing the effective area thereof. Upon downward movement of the piston 45 the lower axial ends of these sleeves will one after another seat in the annular shoulders 43 formed on the interior of the housing 40, consequently proportionately reducing the effective area of the piston as it is returned to its downward extreme position.

From the foregoing it will be appreciated that when one of the wheels of the vehicle hits a bump or irregular place in the road an upward movement of the piston 45 will be effected, the magnitude of this movement being dependent upon the nature and severity of the shock encountered. In the event of a shock of substantial magnitude the upward movement of the piston 45 will be substantial, and consequently as this upward movement thereof takes place the effective area of the piston will be proportionately increased in accordance with the number of sleeves which are moved with it. This shock will be transmitted directly to the hydraulic fluid which will uniformly distribute this shock throughout the other hydraulic suspension units consequently greatly minimizing the shock actually transmitted to the body of the vehicle.

In the modified form of the invention shown in Fig. 4 of the drawings substantially the same type of chassis construction is illustrated except that the duct leading from the housing has been substantially modified. In this form of the invention a housing 65 is substituted for the housing 43 but inasmuch as the interior construction and configuration of this unit is substantially identical with that shown in Fig. 3, the same reference characters have been utilized to designate the various parts thereof. Communication with the housing 55 is established through a cylindrical chamber 66 in communication with the upper end thereof.

A double ended piston member comprising a block 67 and having cup-shaped washers 68 secured to the axial ends thereof is mounted for movement within the cylindrical chamber 66. The interior of the housing 65 is filled with oil which contacts one end of the piston 67. A plug 69 serves to seal the end of the chamber 66 and has connected thereto a conduit 70 which extends along the frame of the vehicle to a centrally disposed air tank 71. As is clear by reference to Fig. 4, each of the individual hydraulic suspensions is provided with a conduit in communication with the air tank 71 which is common to all of the suspensions of the chassis. In this form of the invention it will be readily appreciated that as a shock is imposed upon one of the wheels the fluid within the housing 65 will cause an axial movement of the piston 67 in the cylindrical housing 66 and effect a movement of air along the conduit 70 to the tank 71 consequently increasing the pressure of the air in this tank. The presence of this air tank which is common to all of the hydraulic suspension units serves to resiliently cushion the shock and at the same time transmit the shock substantially equally to all of the wheel suspensions.

This construction has been found to provide an extremely satisfactory and resilient mounting for a vehicle body with respect to the wheels thereof, and serves to not only distribute the shocks imposed upon individual wheels but serves to cushion the shocks and consequently prevent the transmission thereof to the occupants of the vehicle.

Many other and further modifications of the above described form of the invention falling within the scope of the sub-joined claims, will be clearly apparent to those skilled in the art.

What I claim is:

1. A hydraulic suspension for interconnecting the running gear of a vehicle with the chassis thereof, comprising in combination, a housing and a piston, one secured to the chassis of a vehicle and the other to the running gear thereof, said housing having a cylindrical opening therein adapted to snugly telescopically receive said piston, a plurality of concentric sleeves telescopically surrounding said piston, the innermost of said sleeves telescoping over said piston and the outermost of said sleeves snugly engaging the interior surface of said housing, and means on each of said sleeves adapted to engage the next adjacent sleeve whereby to provide a progressively increasing effective area of said piston as the same moves into said cylinder.

2. A hydraulic suspension for interconnecting the running gear of a vehicle with the chassis thereof, comprising in combination, a housing and a piston, one secured to the chassis of a vehicle and the other to the running gear thereof, said housing having a cylindrical opening therein adapted to snugly telescopically receive said piston, a plurality of concentric sleeves telescopically surrounding said piston, the innermost of said sleeves telescoping over said piston and the outermost of said sleeves snugly engaging the interior surface of said housing, said housing having a series of axially spaced abutments formed thereon, each of said abutments adapted to engage one of said sleeves whereby to provide a progressively decreasing effective area of said piston as the same moves outwardly from said cylinder.

3. A hydraulic suspension for interconnecting the running gear of a vehicle with the chassis thereof, comprising in combination, a housing and a piston, one secured to the chassis of a vehicle and the other to the running gear thereof, said housing having a cylindrical opening therein adapted to snugly telescopically receive said piston, a plurality of concentric sleeves telescopically surrounding said piston, the innermost of said sleeves telescoping over said piston and the outermost of said sleeves snugly engaging the interior surface of said housing, means on each of said sleeves adapted to engage the next adjacent sleeve whereby to provide a progressively increasing effective area of said piston as the same moves into said cylinder, said housing having a series of axially spaced abutments formed thereon, each of said abutments adapted to engage one of said sleeves whereby to provide a progressively decreasing effective area of said piston as the same moves outwardly from said cylinder.

CLAUD L. STEVENS.